United States Patent Office 3,669,827
Patented June 13, 1972

3,669,827
SOLVENT RESISTANT POLYETHYLENE CONTAINERS
John McNaughton Kolyer, Morris Township, Morris County, and Albert Andrew Kveglis, Clifton, N.J., assignors to Allied Chemical Corporation, New York, N.Y.
No Drawing. Filed May 21, 1970, Ser. No. 39,511
Int. Cl. B29c 5/04; B32b 27/08, 27/34
U.S. Cl. 161—227                                           5 Claims

ABSTRACT OF THE DISCLOSURE

A method of preparing hollow polyethylene containers having a nylon liner by rotational casting whereby the polyethylene is rotationally molded; a copolymer of ethylene and an alkyl acrylate or methacrylate or a vinyl ester is added; molding is continued to bond a layer of the copolymer to the polyethylene; a catalysed and promoted lactam solution is added; and casting continued under anionic polymerization conditions for the lactam to form an inner nylon layer bonded to the copolymer. The process forms hollow polyethylene containers having a firmly bonded nylon liner which is resistant to solvents.

BACKGROUND OF THE INVENTION

Containers of polyethylene have enjoyed widespread use and commercial success due to their toughness, inertness, impermeability to moisture, and low cost. Polyethylene has been found adaptable to various processing techniques including rotational molding. This fabrication method is particularly suitable for producing large or irregular hollow shapes, such as drums, tanks, barrels and the like. However, polyethylene has a somewhat limited impermeability to organic solvents, e.g. aliphatic hydrocarbons such as gasoline fractions, aromatic hydrocarbons, esters, ketones and the like, which has limited the use of polyethylene containers for organic solvents. The replacement of polyethylene by other thermoplastics having higher solvent resistance has been tried, but is disadvantageous for various reasons. For example, nylon is a commercially available thermoplastic which can be rotationally molded and has better solvent resistance than polyethylene, but its higher cost has precluded its substitution for polyethylene in mass produced containers for organic solvents. It has been suggested that polyethylene containers be coated with a nylon liner, but since polyethylene and nylon are incompatible, the surface of the polyethylene must be pretreated, as by flaming, chlorination, oxidation and the like, to promote the formation of a bond between the polyethylene and the nylon. Such methods are not applicable to rotational molding however.

SUMMARY OF THE INVENTION

It is an object of the present invention to provide a method of bonding nylon to polyethylene. It is another object to provide a method for firmly bonding a nylon liner to a polyethylene container fabricated by rotational molding. It is a further object to provide unified hollow polyethylene containers having a firmly bonded nylon lining. Other objects will become apparent from the following detailed description thereof.

According to the method of the present invention, polyethylene containers having a firmly bonded nylon lining can be prepared by rotationally molding polyethylene in conventional manner, adding a copolymer of polyethylene in an amount sufficient to uniformly coat the polyethylene molding, adding a lactam monomer containing an anionic catalyst and cocatalyst, and polymerizing the lactam. The ethylene copolymer layer provides a means of firmly bonding the nylon liner to the polyethylene molding. This result was surprising since the polyethylene copolymers of the invention do not form a bond with preformed nylon by this method. Unexpectedly we found that the copolymer layer forms a strong bond both with the preformed polyethylene and with nylon that is anionically polymerized after the copolymer layer is formed.

DETAILED DESCRIPTION OF THE INVENTION

According to the present process, a polyethylene article is first formed by rotational molding in a hollow mold. The nature of the polyethylene is not critical and either low density or high density polyethylene can be employed, whether prepared from Phillip's or Ziegler catalyst. The polyethylene should be in powdered form, as is known, preferably 35–50 mesh particle size.

When the polyethylene molding has been made, a copolymer of ethylene and an alkyl acrylate or methacrylate or a vinyl ester is added. Suitable copolymers are those of ethylene and an alkyl acrylate or methacrylate, such as methyl acrylate, ethyl acrylate, methyl methacrylate, ethyl methacrylate and the like, containing from about 5% up to about 40%, preferably about 15 to 20% by weight of the copolymer, of the alkyl acrylate or methacrylate, and vinyl esters such as vinyl acetate containing from about 10% up to about 40% by weight of the copolymer of the vinyl ester. The amount of copolymer added is not critical and is dependent upon the size and contour of the molded polyethylene article, the temperature of casting and the melt index of the copolymer. A sufficient amount of the copolymer is added so as to form a uniform coating or lining on the polyethylene molding. Generally, amounts of from 20 to 50% by weight of the polyethylene employed in preparing the molding are required. A large excess of the copolymer is not desirable since it adds to the time required to make the unified lined moldings of the invention, and subtracts from the usable volume of the finished article.

When the copolymer has been uniformly deposited on the polyethylene molding, the mold is purged with an inert, dry gas, such as nitrogen, carbon dioxide, helium and the like, to remove any moisture and oxygen.

An anionic lactam polymerization mixture is then added to the mold, comprising a lactam monomer, an anionic catalyst and a cocatalyst promoter for the polymerization.

Suitable lactams include lactams having from 5 to 11 carbon atoms in the lactam ring and mixtures of lactams. Illustrative lactams include ε-caprolactam, caprylolactam, enantholactam, undecanolactam, laurolactam and the like. ε-Caprolactam is particularly preferred in the present invention.

Suitable anionic catalysts are well known and include the alkali metals such as lithium, potassium and sodium and the alkaline earth metals such as calcium, barium, magnesium and the like, or the hydroxides, oxides, hydrides, alkoxides, amides, borohydrides, alkyl and aryl derivatives of these metals. Such derivatives include for example sodium hydroxide, lithium hydride, potassium methoxide, sodamide, potassium naphthyl, lithium ethyl and the like. Generally, amounts of from about .02 to about .20%, preferably .03% to .10%, by weight of the lactam of the catalyst is employed in the case of lithium hydride. The corresponding weight percents of other catalysts will be proportional to their molecular weights.

Cocatalyst promoters for the anionic polymerization of lactams are also well known and are disclosed for example in U.S. Pats. 3,017,391, 3,017,392, 3,086,962, 3,018,273, 3,028,369, and 3,309,393; French Pat. 1,349,953 and British Pat. 924,453. Suitable cocatalysts include N-acetyl caprolactam, N-benzoyl caprolactam, N-ethylcarbamyl caprolactam, N - phenyl - succinimide, N-methylphthalimide, the N,N',N''-trimethyl ester of isocyanuric acid, 1,3,5-triphenoxy-s-triazine, diphenylcarbamyl imidazole, 1,1'-terephthaloylbis-(pyrazole), dicaprolactam ether, 2-phenoxybenzothiazole, isophthaloylbis-(3,5-dimethylpyrazolide) and the like. The cocatalyst is generally employed in amounts of from about .05% to about 1.0% by weight of the lactam, preferably in amounts of from 0.1 to 0.5% by weight.

The lactam polymerization mixture can be premixed prior to adding to the mold, but preferably two solutions, one containing a catalysed lactam solution and the other a solution of the lactam and the cocatalyst, are metered to the mold simultaneously. The casting is then continued under anionic polymerization conditions for the lactam until a uniform nylon layer has been deposited onto the copolymer layer of the molding, forming a unitary polyethylene hollow molded article having an integrally bound nylon liner. The amount of lactam added is that sufficient to coat the interior of the polyethylene casting. Additional lactam solution can be added for a thicker lining.

Various modifying agents can be present in the polymers and copolymers suitable for use in the invention, such as heat, light and oxidation stabilizers, plasticizers, pigments, reinforcing agents and mold release agents, such as will be known to those skilled in the art. The cast articles of the invention are particularly suitable for containers for organic solvents, e.g. storage barrels, gasoline tanks and the like.

The invention will be further illustrated by the following examples, but it is to be understood that the invention is not meant to be limited to the details described therein. In the examples all parts and percentages are by weight unless otherwise noted.

In the examples the peel bond test was conducted on 1" x 5" strips of the cast articles by cutting apart one end of the strips at the nylon-polyethylene interface and mounting on an Instron tester. The layers were pulled apart using a 1"/min. crosshead speed. The results were measured in pounds.

EXAMPLE 1

A round bottom flask was immersed in an oil bath at 190–207° C. and rotated at 15 r.p.m. 80 parts of low density polyethylene having a melt index of 22 and density of 0.915 g./ml. were added and heated for 30 minutes when a uniform polyethylene layer was deposited on the walls of the flask. 40 parts of a copolymer of ethylene and ethyl acrylate containing 15% of ethyl acrylate having a melt index of 6 and density of 0.931 g./ml. were then added, and rotation continued for 15 minutes. A layer of the copolymer was uniformly deposited onto the polyethylene. 80 parts of ε-caprolactam containing 0.06% of lithium hydride catalyst and 0.25% of triphenoxy-s-triazine cocatalyst were added under nitrogen and reaction continued under an inert atmosphere for 20 minutes.

The flask was cooled, the casting removed and peel bond strengths of the layers determined. The apparent bond strength was 150 lbs., the polyethylene tearing before rupture of the bond occurred. The ultimate tensile strength of the bond determined according to ASTM test D 638 was 976 p.s.i.

EXAMPLE 2

The procedure of Example 1 was followed except substituting a polyethylene/ethyl acrylate copolymer containing 30% ethyl acrylate having a melt index of 18 and density of 0.932 g./ml. as the bonding layer. The peel bond strength was 56 lbs.

EXAMPLE 3

The procedure of Example 1 was followed except substituting a polyethylene/vinyl acetate copolymer containing 27–29% vinyl acetate and having a melt index of 2.4–3.4 as the bonding layer. The peel bond strength was 42 lbs.

EXAMPLE 4

When the procedure of Example 1 is followed substituting a polyethylene having a melt index of 17.0 and density of 0.961, a peel bond strength of over 100 lbs. is obtained.

EXAMPLE 5

By way of comparison the procedure of Example 1 was followed substituting other polymers and copolymers of ethylene outside the scope of the present invention as the intermediate layer. A description of these polymers is given below:

(1) QX 3623.17 is a polyethylene/acrylic acid copolymer containing 17% of acrylic acid having a molecular weight of 35,000–40,000 sold by Dow Chemical Co.
(2) Surlyn A is a polyethylene/acrylic acid copolymer containing 8% of acrylic acid partially neutralized with metal ions (sodium) sold by the Du Pont Co.
(3) A copolymer of ethylene and propylene having a melt flow rate at 230° C. of 2.5 g./10 min. and an annealed density of 0.903–0.907 g./ml.
(4) Polyethylene having a molecular weight of about 8000 terminated with diisobutyl maleate.

No bond to the nylon liner was obtained with any of the above polymers.

We claim:

1. A molded article comprising a unified, seamless, hollow container having a polyethylene outer layer and a nylon liner bonded to the polyethylene by means of an intermediate layer of a copolymer of ethylene and an alkyl acrylate or methacrylate or a vinyl ester.

2. An article according to claim 1 wherein the copolymer is an ethylene/alkyl acrylate copolymer having from about 5 to about 40% by weight of alkyl acrylate.

3. An article according to claim 2 wherein the alkyl acrylate is ethyl acrylate.

4. An article according to claim 1 wherein the copolymer is an ethylene/vinyl acetate copolymer having from about 10 to about 40% by weight of vinyl acetate.

5. An article according to claim 2 wherein the copolymer is an ethylene/ethyl acrylate copolymer containing about 15 to 20% by weight of ethyl acrylate.

References Cited

UNITED STATES PATENTS

| | | | |
|---|---|---|---|
| 3,423,231 | 1/1969 | Lutzmann | 117—68.5 |
| 2,543,229 | 2/1951 | Chapman | 161—251 |
| 3,519,531 | 7/1970 | James et al. | 161—254 |
| 3,457,337 | 7/1969 | Turner | 264—98 |
| 2,736,925 | 3/1956 | Heisler et al. | 156—245 |
| 3,246,069 | 4/1966 | Maynord | 264—255 |
| 3,409,714 | 11/1968 | Strugar | 264—242 |
| 3,113,831 | 12/1963 | Coale | 264—94 X |
| 3,275,733 | 9/1966 | Schule et al. | 264—310 |
| 3,340,091 | 9/1967 | Zweig | 117—138.8 |
| 3,420,729 | 1/1969 | Roberts | 161—7 |

JOHN T. GOOLKASIAN, Primary Examiner

R. A. DAWSON, Assistant Examiner

U.S. Cl. X.R.

156—332; 161—254; 264—255, 310